(12) United States Patent
Wang

(10) Patent No.: US 6,903,933 B2
(45) Date of Patent: Jun. 7, 2005

(54) COMPUTER HOUSING WITH A DETACHABLE BOARD-MOUNTING PLATE

(75) Inventor: Ching-Wen Wang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 90 days.

(21) Appl. No.: 10/452,315

(22) Filed: May 30, 2003

(65) Prior Publication Data

US 2004/0120108 A1 Jun. 24, 2004

(30) Foreign Application Priority Data

Dec. 19, 2002 (TW) ........................................ 91220657 U

(51) Int. Cl.$^7$ ................................................ G06F 1/16
(52) U.S. Cl. ...................... 361/727; 361/736; 361/740; 361/741; 312/223.2
(58) Field of Search ................................ 361/695, 697, 361/683, 718–720, 724–728, 736, 741, 748, 752, 759; 165/80.3, 122–126; 312/223.1, 223.2, 263, 257.1, 265.5, 265.6, 293.3

(56) References Cited

U.S. PATENT DOCUMENTS

| | | | | |
|---|---|---|---|---|
| 5,661,640 A | * | 8/1997 | Mills et al. | 361/801 |
| 5,691,504 A | * | 11/1997 | Sands et al. | 174/35 R |
| 6,234,592 B1 | * | 5/2001 | Liu et al. | 312/223.2 |
| 6,544,047 B2 | * | 4/2003 | Moore | 439/95 |
| 6,574,101 B2 | * | 6/2003 | Tanaka et al. | 361/687 |

* cited by examiner

*Primary Examiner*—Lynn Feild
*Assistant Examiner*—Anthony Q. Edwards
(74) *Attorney, Agent, or Firm*—Ladas & Parry LLP

(57) ABSTRACT

A computer housing includes a frame, a fixed plate mounted in a space confined by the frame and formed with a plurality of slots, and a board-mounting plate mounted slidably and detachably on the fixed plate and formed with a plurality of stamped tabs. The board-mounting plate is slidable to a locking position where each tab engages a periphery of a respective one of the slots.

8 Claims, 6 Drawing Sheets

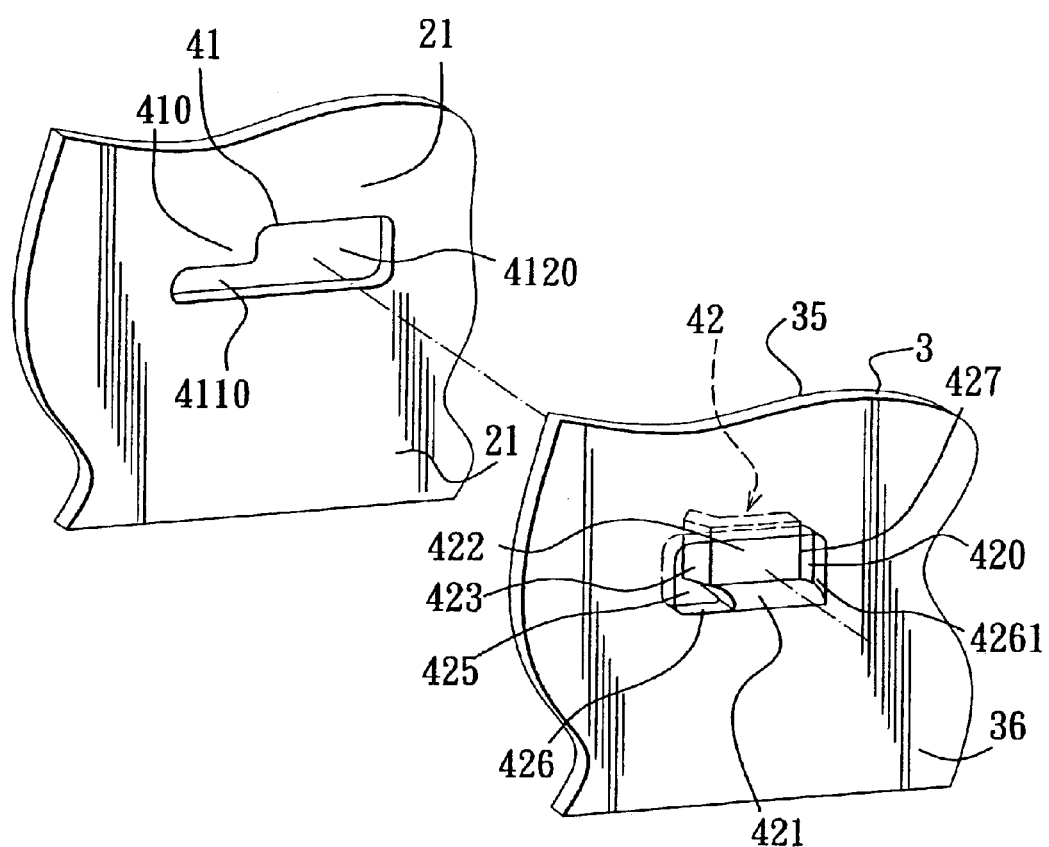
F I G. 3

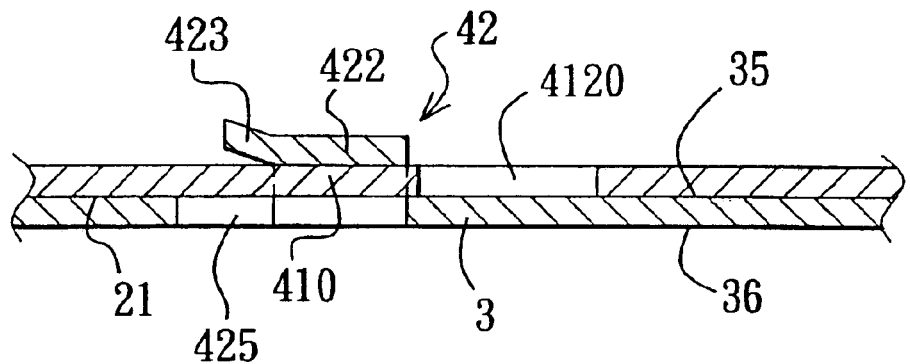
F I G. 4A
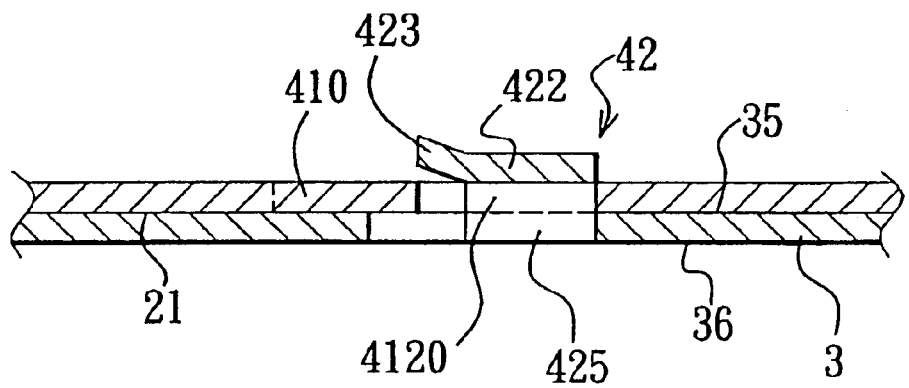
F I G. 4B

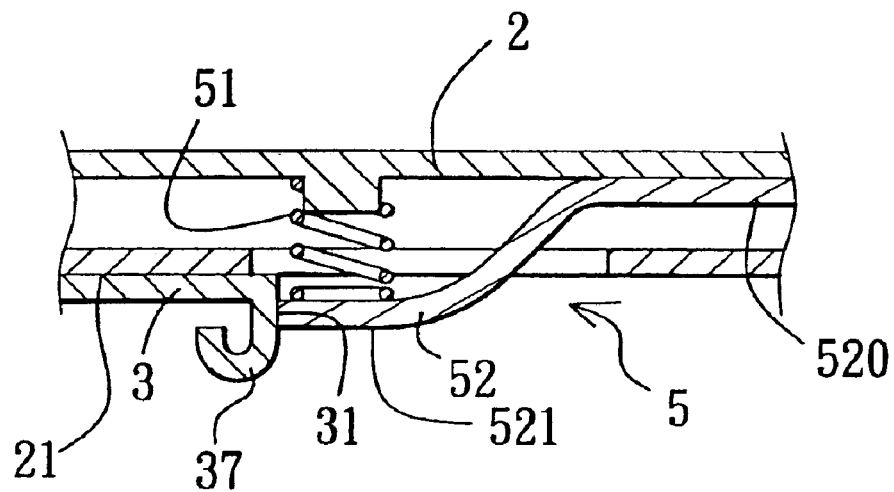
F I G. 5
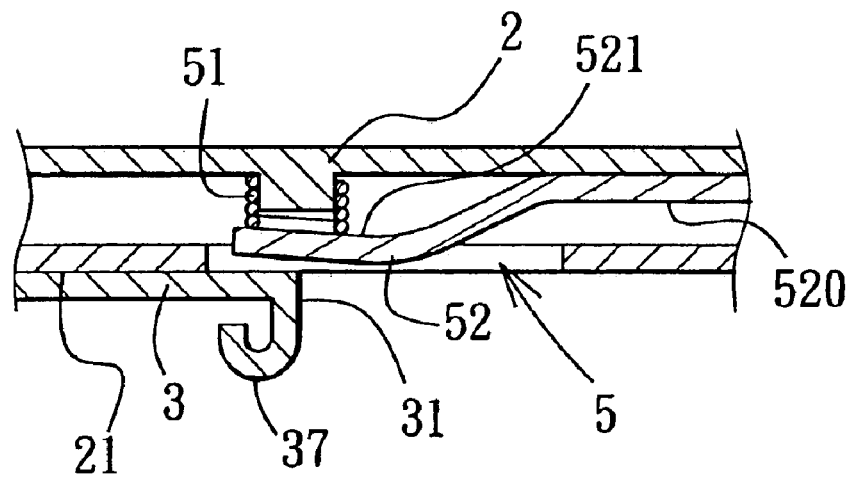
F I G. 6

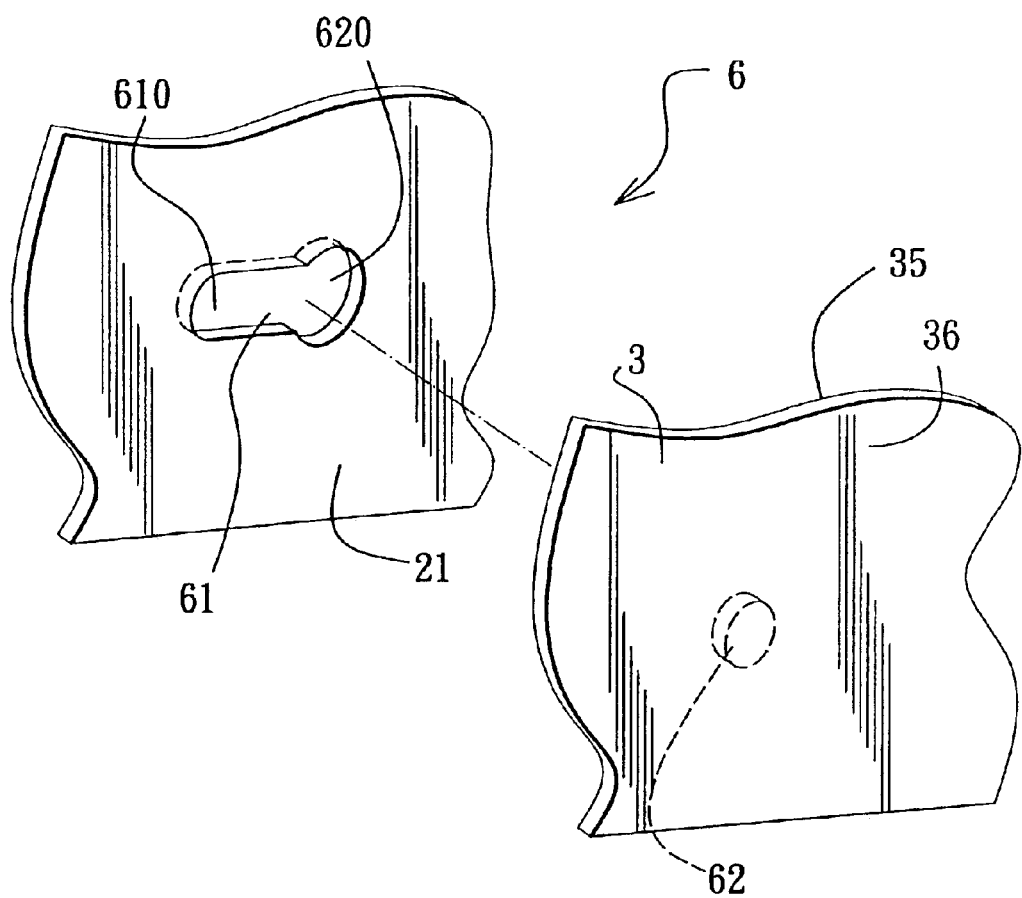
F I G. 7

COMPUTER HOUSING WITH A DETACHABLE BOARD-MOUNTING PLATE

CROSS-REFERENCE TO RELATED APPLICATION

This application claims priority of Taiwanese Application No. 091220657, filed on Dec. 19, 2002.

BACKGROUND OF THE INVENTION

1. Field of the Invention

This invention relates to a computer housing, more particularly to a computer housing with a detachable board-mounting plate for receiving a printed circuit board thereon.

2. Description of the Related Art

A computer housing of a desktop personal computer or a server normally includes a frame and a fixed plate that is fixed to the frame and that is adapted to receive a printed circuit board thereon. Since the structure of the fixed plate depends on the type of the printed circuit board used in the computer, the conventional computer housing is relatively inflexible, and manufacturers are thus forced to manufacture different types of computer housings for different types of printed circuit boards.

SUMMARY OF THE INVENTION

Therefore, the object of the present invention is to provide a computer housing with a detachable board-mounting plate that is capable of overcoming the aforementioned drawback of the prior art and that can be easily mounted on the computer housing.

According to the present invention, there is provided a computer housing that comprises: a frame confining a mounting space; a laterally extending fixed plate mounted on the frame within the mounting space and formed with a plurality of elongated engaging slots that extend in a lateral direction; and a board-mounting plate mounted detachably and slidably on the fixed plate and adapted to receive a printed circuit board thereon. The board-mounting plate is formed with a plurality of stamped tabs that extend respectively through the engaging slots. The board-mounting plate is slidable relative to the fixed plate in the lateral direction between a locking position, in which each of the tabs abuts against and engages frictionally a portion of a periphery of the respective one of the engaging slots, thereby preventing removal of the board-mounting plate from the fixed plate, and an unlocking position, in which each of the tabs disengages from the portion of the periphery of the respective one of the engaging slots, thereby permitting removal of the board-mounting plate from the fixed plate.

BRIEF DESCRIPTION OF THE DRAWINGS

In drawings which illustrate an embodiment of the invention,

FIG. 3 and FIGS. 4A and 4B are fragmentary views to illustrate how the board-mounting plate is to be slidably and detachably mounted on a fixed plate of the computer housing of FIG. 1;

FIGS. 5 and 6 are fragmentary views to illustrate how a limiting member engages and disengages an abutting side of the board-mounting plate of the computer housing of FIG. 1; and FIG. 7 is a fragmentary view to illustrate how a guiding post engages a guiding slot formed in the fixed plate of the computer housing of FIG. 1.

DETAILED DESCRIPTION OF THE PREFERRED EMBODIMENT

Figure 1:
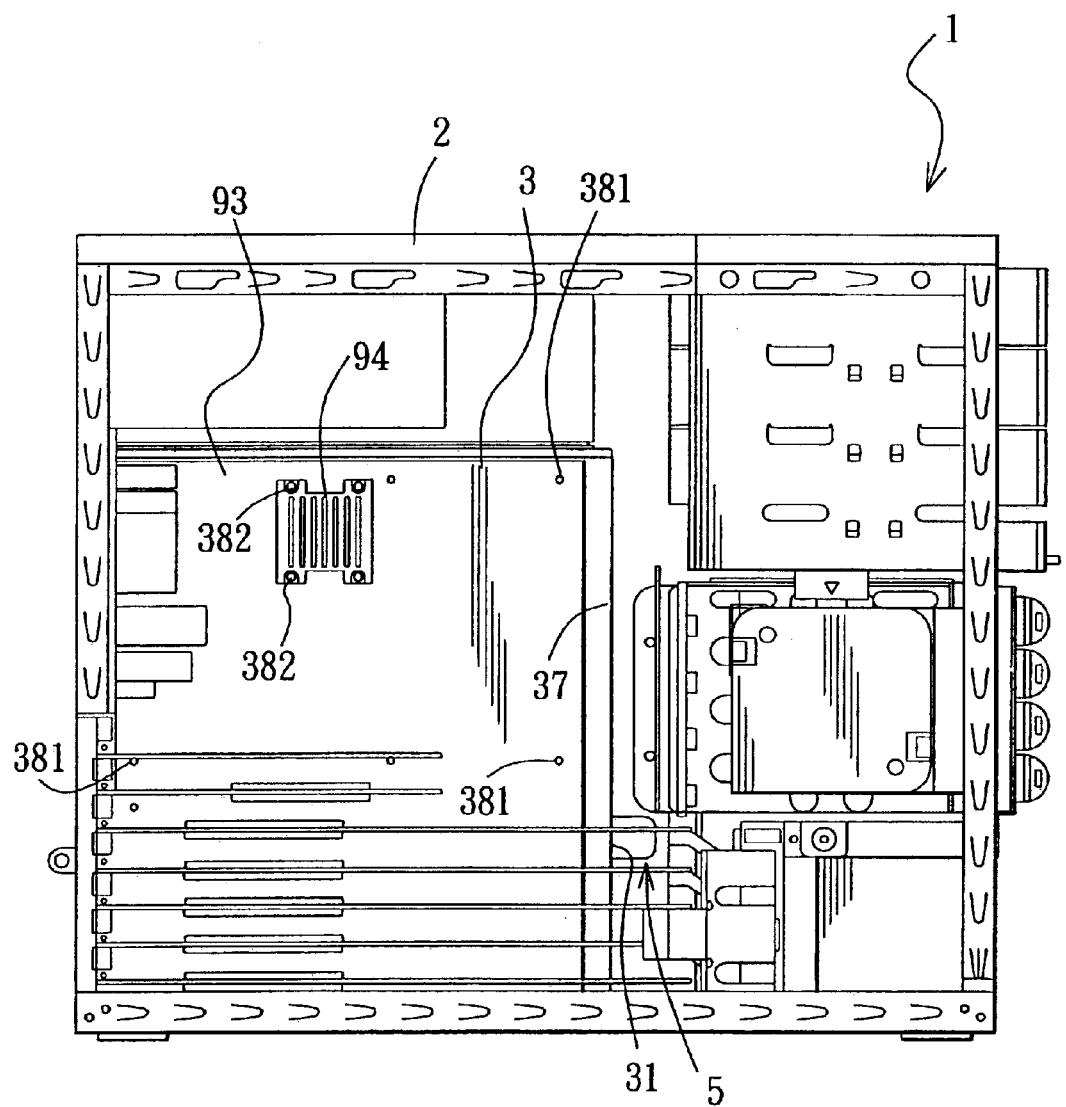
FIG. 1 is a schematic top view of a preferred embodiment of a computer housing of this invention with a detachable board-mounting plate and a printed circuit board mounted on the board-mounting plate.
Figure 2:
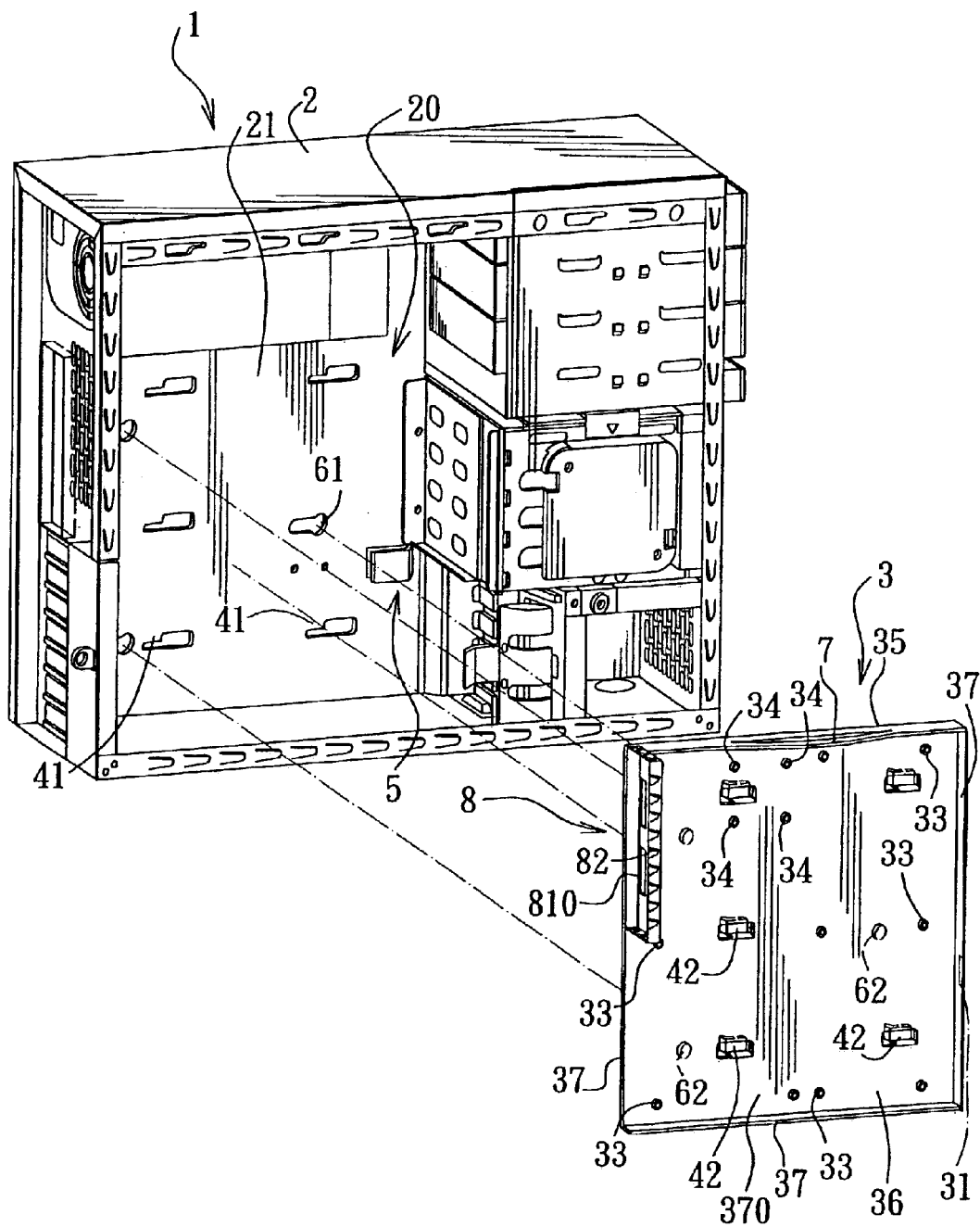
FIG. 2 is an exploded view of the computer housing of FIG. 1.

FIGS. 1 to 3 illustrate a preferred embodiment of a computer housing 1 according to this invention. The computer housing 1 includes: a frame 2 confining a mounting space 20; a laterally extending fixed plate 21 mounted on the frame 2 within the mounting space 20 and formed with a plurality of elongated engaging slots 41 that extend in a lateral direction; and a board-mounting plate 3 mounted detachably and slidably on the fixed plate 21 and adapted to receive a printed circuit board 93 thereon. The board-mounting plate 3 is formed with a plurality of stamped tabs 42 that extend respectively through the engaging slots 41. The board-mounting plate 3 is slidable relative to the fixed plate 21 in the lateral direction between a locking position (see FIG. 4A) in which each of the tabs 42 abuts against and engages frictionally a portion 410 of a periphery of the respective one of the engaging slots 41, thereby preventing removal of the board-mounting plate 3 from the fixed plate 21, and an unlocking position (see FIG. 4B), in which each of the tabs 42 disengages from the portion of the periphery of the respective one of the engaging slots 41, thereby permitting removal of the board-mounting plate 3 from the fixed plate 21.

Each of the engaging slots 41 has an enlarged section 4120 and a reduced section 4110 extending and reducing from the enlarged section 4120. The board-mounting plate 3 is formed with a plurality of stamped holes 425, each of which is confined by an inner wall 426. Each of the tabs 42 is substantially L-shaped, and includes a connecting portion 421 that extends from the inner wall 426 of a respective one of the stamped holes 425 through the respective one of the engaging slots 41 in a transverse direction relative to the fixed plate 21, and a laterally extending portion 422 that extends laterally from and that is transverse to the connecting portion 421. The connecting portion 421 extends through the enlarged section 4120 of the respective one of the engaging slots 41 in the transverse direction, and the laterally extending portion 422 is aligned with the enlarged section 4120 of the respective one of the engaging slots 41 in the transverse direction when the board-mounting plate 3 is positioned at the unlocking position. The connecting portion 421 extends through the reduced section 4110 of the respective one of the engaging slots 41 in the transverse direction, and the laterally extending portion 422 is aligned with the portion 410 of the periphery of the respective one of the engaging slots 41 in the transverse direction and engages frictionally the portion 410 of the periphery of the respective one of the engaging slots 41 when the board-mounting plate 3 is positioned at the locking position. The laterally extending portion 422 has a leading end 423 angled away therefrom and disposed adjacent to the portion 410 of the periphery of the respective one of the engaging slots 41 for guiding sliding movement of the board-mounting plate 3 from the unlocking position to the locking position.

The laterally extending portion 422 of each of the tabs 42 has an opposite end 427 opposite to the leading end 423 and disposed adjacent to one side 4261 of the inner wall 426 of a respective one of the stamped holes 425. The opposite end 427 of the laterally extending portion 422 cooperates with the side 4261 of the inner wall 426 of the respective one of the stamped holes 425 to define a gap 420 therebetween for receiving fittingly the portion 410 of the periphery of the respective one of the engaging slots 41 when the board-mounting plate 3 is positioned at the locking position.

Referring to FIGS. 5 and 6, in combination with FIGS. 1 and 2, the board-mounting plate 3 has an abutting side 37 that is formed with an abutting face 31 extending in the transverse direction. The computer housing 1 further includes a limiting member 5 that includes a curved spring plate 52 and an urging member 51. The spring plate 52 has a fixed end 520 which is fixed to the frame 2, and a free end 521 which is opposite to the fixed end 520 and which abuts against the urging member 51 in the transverse direction. The free end 521 of the spring plate 52 is disposed adjacent to and is aligned with the abutting face 31 of the abutting side 37 of the board-mounting plate 3 in the lateral direction when the board-mounting plate 3 is positioned at the locking position so as to limit sliding movement of the board-mounting plate 3 in the lateral direction. The free end 521 of the spring plate 52 is resiliently depressible against the urging member 51 to move away from the abutting face 31 of the abutting side 37 of the board-mounting plate 3 in the transverse direction so as to permit sliding movement of the board-mounting plate 3 in the lateral direction.

Referring to FIG. 7, in combination with FIGS. 1 and 2, the board-mounting plate 3 has a first surface 35 confronting the fixed plate 21. The computer housing 1 further includes a plurality of guiding members 6, each of which includes a guiding slot 61 that is formed in the fixed plate 21 and that extends in the lateral direction, and a guiding post 62 that projects from the first surface 35 of the board-mounting plate 3 in the transverse direction. The guiding slot 61 has an enlarged end 620 and an extension 610 that extends and that is reduced from the enlarged end 620 in the lateral direction. During mounting of the board-mounting plate 3 on the fixed plate 21, the guiding posts 62 of the guiding members are respectively aligned with and extend through the guiding slots 61 in the transverse direction so as to position the board-mounting plate 3 at the unlocking position. The guiding posts 62 are then slidably moved into the extension 610 so as to guide sliding movement of the board-mounting plate 3 from the unlocking position to the locking position.

Referring back to FIGS. 1 and 2, the board-mounting plate 3 further has a second surface 36 opposite to the first surface 35 and having a peripheral edge 370, and is formed with a plurality of first threaded posts 33 that project from the second surface 36 in the transverse direction and that are disposed adjacent to the peripheral edge 370. The first threaded posts 33 are adapted to receive first screw fasteners 381 to fasten the printed circuit board 93 onto the board-mounting plate 3. The board-mounting plate 3 is further formed with a plurality of second threaded posts 34 that project from the second surface 36 in the transverse direction and that are adapted to receive second screw fasteners 382 to fasten a driving device 94, such as a cooling fan, onto the printed circuit board 93. Conventionally, the cooling fan is directly fastened onto the printed circuit board, which has an adverse effect on the printed circuit board as it tends to weaken the mechanical strength of the printed circuit board. The board-mounting plate 3 is provided with a handle 7 on one side so as to facilitate sliding operation of the board-mounting plate 3. A connector-mounting member 8 is mounted on one end of the board-mounting plate 3, and is formed with a plurality of holes 810 for receiving input and output connectors (not shown) that are respectively connected to electronic components on the printed circuit board 93 and electronic devices mounted in the computer housing 1. A plurality of stamped spring tongues 82 are formed on the connector-mounting member 8, and abut against and are electrically connected to the frame 2 for grounding purposes.

With the inclusion of the detachable board-mounting plate 3 in the computer housing 1 of this invention, the aforesaid drawback associated with the prior art can be eliminated. Moreover, the board-mounting plate 3 can be easily mounted on the fixed plate 21 by virtue of engagement between the tabs 42 and the respective engaging slots 41.

With the invention thus explained, it is apparent that various modifications and variations can be made without departing from the spirit of the present invention. It is therefore intended that the invention be limited only as recited in the appended claims.

I claim:

1. A computer housing comprising:

a frame confining a mounting space;

a laterally extending fixed plate mounted on said frame within said mounting space and formed with a plurality of elongated engaging slots that extend in a lateral direction;

a board-mounting plate mounted detachably and slidably on said fixed plate and adapted to receive a printed circuit board thereon, said board-mounting plate being formed with a plurality of stamped tabs that extend respectively through said engaging slots, said board-mounting plate being slidable relative to said fixed plate in said lateral direction between a locking position, in which each of said tabs abuts against and engages frictionally a portion of a periphery of the respective one of said engaging slots, thereby preventing removal of said board-mounting plate from said fixed plate, and an unlocking position, in which each of said tabs disengages from said portion of said periphery of the respective one of said engaging slots, thereby permitting removal of said board-mounting plate from said fixed plate;

wherein each of said engaging slots has an enlarged section and a reduced section extending and reducing from said enlarged section, said board-mounting plate being formed with a plurality of stamped holes, each of which is confined by an inner wall, each of said tabs being substantially L-shaped and including a connecting portion that extends from said inner wall of a respective one of said stamped holes through the respective one of said engaging slots in a transverse direction relative to said fixed plate, and a laterally extending portion that extends laterally from and that is transverse to said connecting portion, said connecting portion extending through said enlarged section of the respective one of said engaging slots in said transverse direction and said laterally extending portion being aligned with said enlarged section of the respective one of said engaging slots in said transverse direction when said board-mounting plate is positioned at said unlocking position, said connecting portion extending through said reduced section of the respective one of said engaging slots in said transverse direction and said laterally extending portion being aligned with said portion of said periphery of the respective one of said engaging slots in said transverse direction and engaging frictionally said portion of said periphery of the respective one of said engaging slots when said board-mounting plate is positioned at said locking position, said laterally extending portion having a leading end angled away therefrom and disposed adjacent to said portion of said periphery of the respective one of said engaging slots for guiding sliding movement of said board-mounting plate from said unlocking position to said locking position;

wherein said laterally extending portion of each of said tabs has an opposite end opposite to said leading end and disposed adjacent to one side of said inner wall of a respective one of said stamped holes, said opposite end cooperating with said side of said inner wall of the respective one of said stamped holes to define a gap therebetween for receiving fittingly said portion of said periphery of the respective one of said engaging slots when said board-mounting plate is positioned at said locking position;

wherein said board-mounting plate has an abutting side, said computer housing further comprising a limiting member that includes a curved spring plate and an urging member, said spring plate having a fixed end which is fixed to said frame, and a free end which is opposite to said fixed end and which abuts against said urging member in said transverse direction, said free end being disposed adjacent to and being aligned with said abutting side of said board-mounting plate in said lateral direction when said board-mounting plate is positioned at said locking position so as to limit sliding movement of said board-mounting plate in said lateral direction, said free end being resiliently depressible against said urging member to move away from said abutting side of said board-mounting elate in said transverse direction so as to permit sliding movement of said board-mounting plate in said lateral direction.

2. The computer housing of claim 1, wherein said board-mounting plate has a first surface confronting said fixed plate, said computer housing further comprising a plurality of guiding members, each of which includes a guiding slot that is formed in said fixed plate and that extends in said lateral direction, and a guiding post that projects from said first surface of said board-mounting plate in said transverse direction, said guiding slot having an enlarged end and an extension that extends and that is reduced from said enlarged end in said lateral direction, said guiding post extending through said guiding slot in said transverse direction when said board-mounting plate is positioned at said unlocking position, and sliding into said extension when said board-mounting plate is moved from said unlocking position toward said locking position.

3. The computer housing of claim 2, wherein said board-mounting plate further has a second surface opposite to said first surface and having a peripheral edge, and is formed with a plurality of first threaded posts that project from said second surface in said transverse direction and that are disposed adjacent to said peripheral edge, said first threaded posts being adapted to receive first screw fasteners to fasten the printed circuit board onto said board-mounting plate.

4. The computer housing of claim 3, wherein said board-mounting plate is further formed with a plurality of second threaded posts that project from said second surface in said transverse direction and that are adapted to receive second screw fasteners to fasten a driving device onto the printed circuit board.

5. A computer comprising:
a computer housing including
a frame confining a mounting space,
a laterally extending fixed plate mounted on said frame within said mounting space, and a board-mounting plate mounted detachably and slidably on said fixed plate and formed with a plurality of spaced apart first threaded posts and a plurality of spaced apart second threaded posts;

first and second screw fasteners;

a printed circuit board mounted securely on said board-mounting plate through said first screw fasteners which extend through a periphery of said printed circuit board to engage threadedly and respectively said first threaded posts;

a cooling fan disposed at one side of said printed circuit board opposite to said board-mounting plate and secured to said board-mounting plate through said second screw fasteners which extend through said printed circuit board to engage threadedly and respectively said second threaded posts;

wherein said fixed plate is formed with a plurality of elongated engaging slots that extend in a lateral direction, said board-mounting plate being formed with a plurality of stamped tabs that extend respectively through said engaging slots, said board-mounting plate being slidable relative to said fixed plate in said lateral direction between a locking position, in which each of said tabs abuts against and engages frictionally a portion of a periphery of the respective one of said engaging slots, thereby preventing removal of said board-mounting plate from said fixed plate, and an unlocking position, in which each of said tabs disengages from said portion of said periphery of the respective one of said engaging slots, thereby permitting removal of said board-mounting plate from said fixed plate;

wherein each of said engaging slots has an enlarged section and a reduced section extending and reducing from said enlarged section, said board-mounting plate being formed with a plurality of stamped holes, each of which is confined by an inner wall, each of said tabs being substantially L-shaped and including a connecting portion that extends from said inner wall of a respective one of said stamped holes through the respective one of said engaging slots in a transverse direction relative to said fixed plate, and a laterally extending portion that extends laterally from and that is transverse to said connecting portion, said connecting portion extending through said enlarged section of the respective one of said engaging slots in said transverse direction and said laterally extending portion being aligned with said enlarged section of the respective one of said engaging slots in said transverse direction when said board-mounting plate is positioned at said unlocking position, said connecting portion extending through said reduced section of the respective one of said engaging slots in said transverse direction and said laterally extending portion being aligned with said portion of said periphery of the respective one of said engaging slots in said transverse direction and engaging frictionally said portion of said periphery of the respective one of said engaging slots when said board-mounting plate is positioned at said locking position, said laterally extending portion having a leading end angled away therefrom and disposed adjacent to said portion of said periphery of the respective one of said engaging slots for guiding sliding movement of said board-mounting plate from said unlocking position to said locking position;

wherein said laterally extending portion of each of said tabs has an opposite end opposite to said leading end and disposed adjacent to one side of said inner wall of a respective one of said stamped holes, said opposite end cooperating with said side of said inner wall of the respective one of said stamped holes to define a gap therebetween for receiving fittingly said portion of said periphery of the respective one of said engaging slots when said board-mounting plate is positioned at said locking position;

wherein said board-mounting plate has an abutting side, said computer housing further comprising a limiting member that includes a curved spring plate and an urging member, said spring plate having a fixed end which is fixed to said frame, and a free end which is opposite to said fixed end and which abuts against said urging member in said transverse direction, said free end being disposed adjacent to and being aligned with said abutting side of said board-mounting plate in said lateral direction when said board-mounting plate is positioned at said locking position so as to limit sliding movement of said board-mounting plate in said lateral direction, said free end being resiliently depressible against said urging member to move away from said abutting side of said board-mounting plate in said transverse direction so as to permit sliding movement of said board-mounting plate in said lateral direction.

6. The computer housing of claim 5, wherein said board-mounting plate has a first surface confronting said fixed plate, said computer housing further comprising a plurality of guiding members, each of which includes a guiding slot that is formed in said fixed plate and that extends in said lateral direction, and a guiding post that projects from said first surface of said board-mounting plate in said transverse direction, said guiding slot having an enlarged end and an extension that extends and that is reduced from said enlarged end in said lateral direction, said guiding post extending through said guiding slot in said transverse direction when said board-mounting plate is positioned at said unlocking position, and sliding into said extension when said board-mounting plate is moved from said unlocking position toward said locking position.

7. The computer housing of claim 6, wherein said board-mounting plate further has a second surface opposite to said first surface and having a peripheral edge, and is formed with a plurality of first threaded posts that project from said second surface in said transverse direction and that are disposed adjacent to said peripheral edge, said first threaded posts being adapted to receive first screw fasteners to fasten the printed circuit board onto said board-mounting plate.

8. The computer housing of claim 7, wherein said board-mounting plate is further formed with a plurality of second threaded posts that project from said second surface in said transverse direction and that are adapted to receive second screw fasteners to fasten a driving device onto the printed circuit board.

* * * * *